(12) United States Patent
Mi et al.

(10) Patent No.: US 7,618,178 B2
(45) Date of Patent: Nov. 17, 2009

(54) BACKLIGHT CONTAINING FORMED BIREFRINGENCE REFLECTIVE POLARIZER

(75) Inventors: Xiang-Dong Mi, Rochester, NY (US); Junwon Lee, Webster, NY (US); David Kessler, Rochester, NY (US)

(73) Assignee: SKC Haas Display Films Co., Lt.d, Choongchungnamdo (KR)

( * ) Notice: Subject to any disclaimer, the term of this patent is extended or adjusted under 35 U.S.C. 154(b) by 246 days.

(21) Appl. No.: 11/760,863

(22) Filed: Jun. 11, 2007

(65) Prior Publication Data

US 2008/0304282 A1  Dec. 11, 2008

(51) Int. Cl.
*F21V 7/04* (2006.01)
(52) U.S. Cl. .................. 362/607; 362/318; 362/615; 349/61; 349/62; 349/63; 349/96
(58) Field of Classification Search ............... 362/19, 362/318, 607, 615; 349/61–63, 96
See application file for complete search history.

(56) References Cited

U.S. PATENT DOCUMENTS

| | | | |
|---|---|---|---|
| 6,285,423 | B1 | 9/2001 | Li et al. |
| 6,443,585 | B1 | 9/2002 | Saccomanno |
| 6,788,461 | B2 | 9/2004 | Kurtz et al. |
| 6,798,468 | B1 * | 9/2004 | Iijima .................. 349/61 |

* cited by examiner

*Primary Examiner*—Sandra L O'Shea
*Assistant Examiner*—Meghan K Dunwiddie
(74) *Attorney, Agent, or Firm*—Edwin Oh

(57) ABSTRACT

A backlight unit comprises:
(1) a light source;
(2) a light guide plate (LGP) having an incident face toward the light source and having a refractive index $n_{LGP}$;
(3) a reflective polarizer having formed birefringence in optical contact with the LGP including a layer having parameters of the reflective polarizer selected to provide R0>0.8 for one polarization state and T90>0.8 for the orthogonal polarization state, for light of wavelength of 550 nm, for least one reflective polarizer angle of light incidence $\theta_a$.

21 Claims, 18 Drawing Sheets

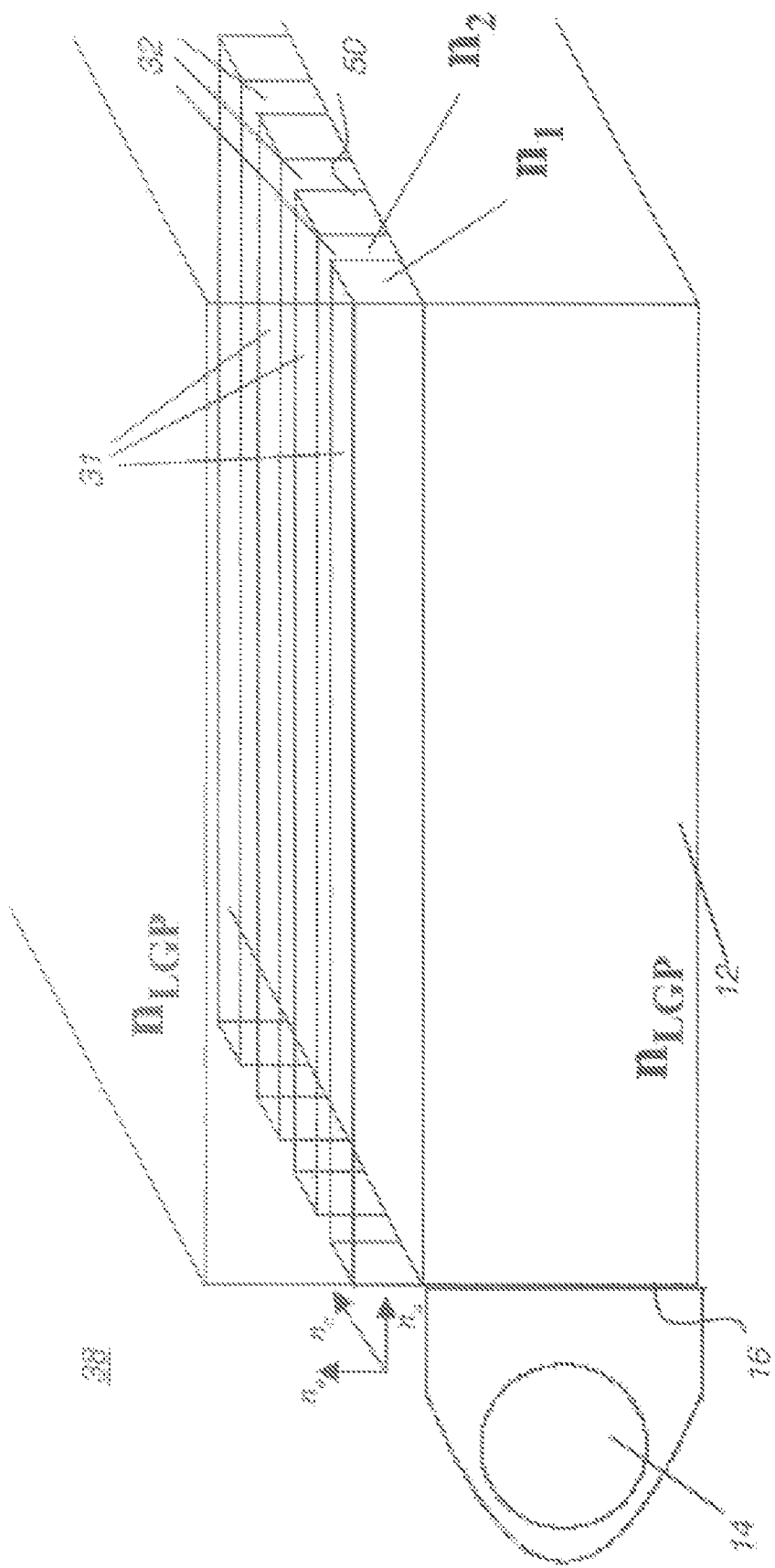

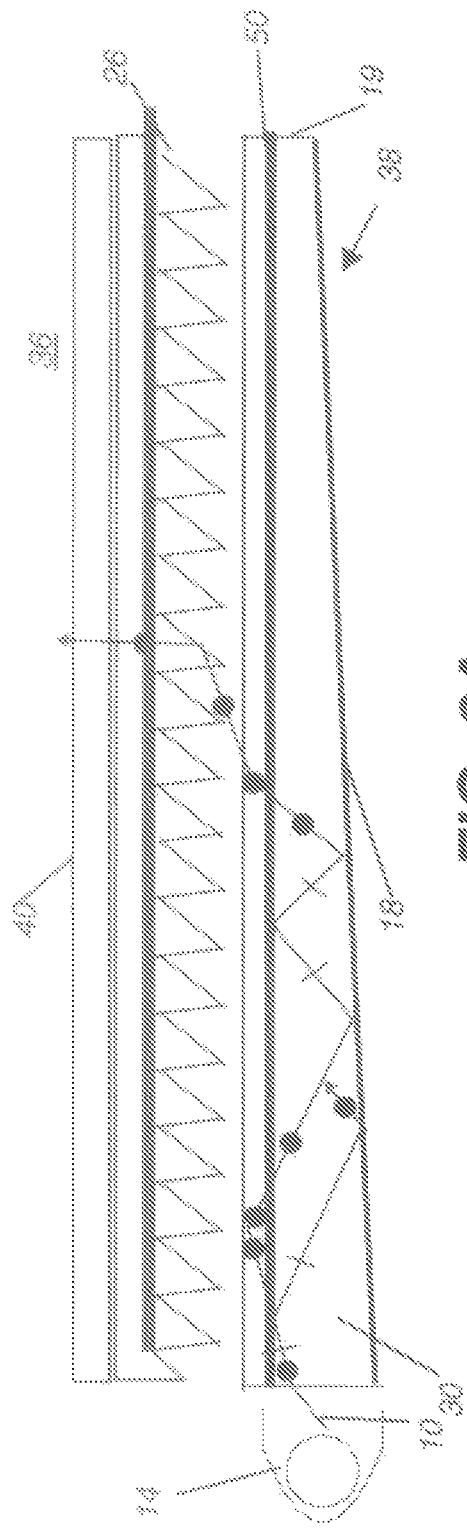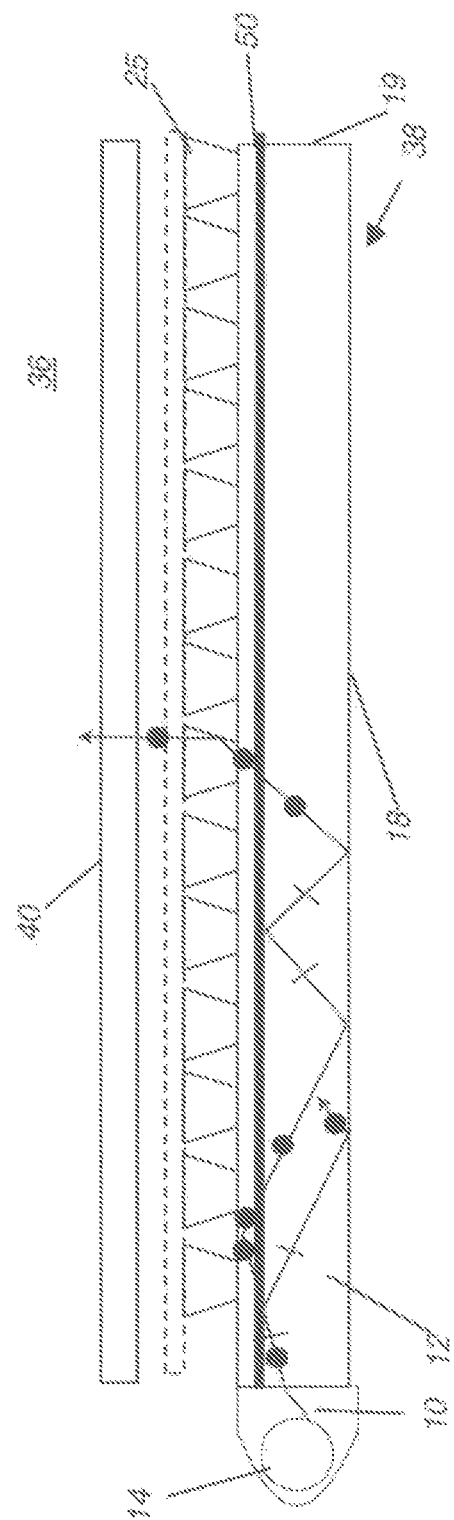

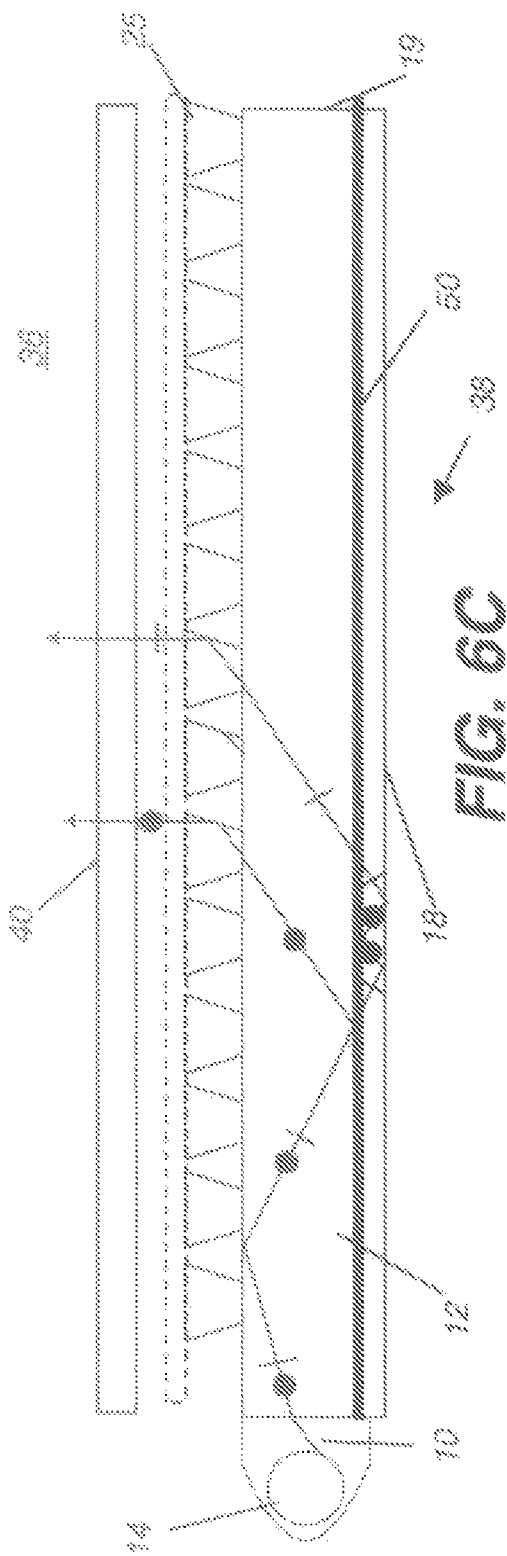
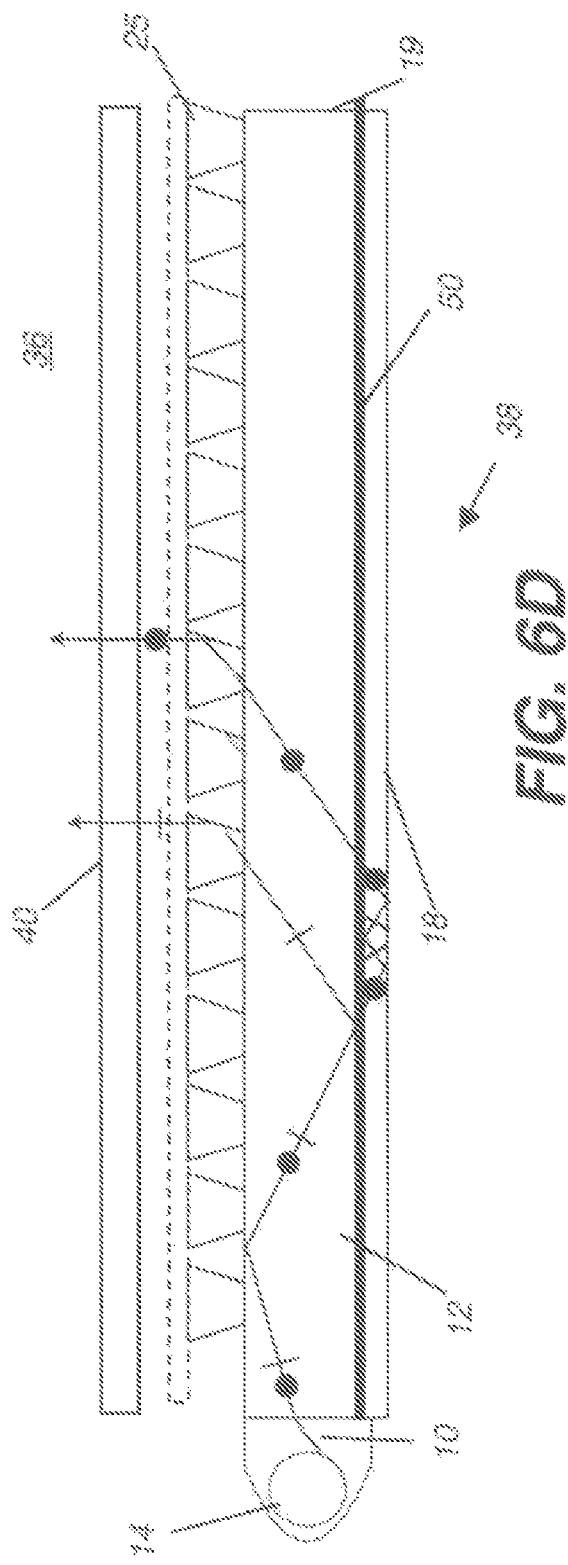

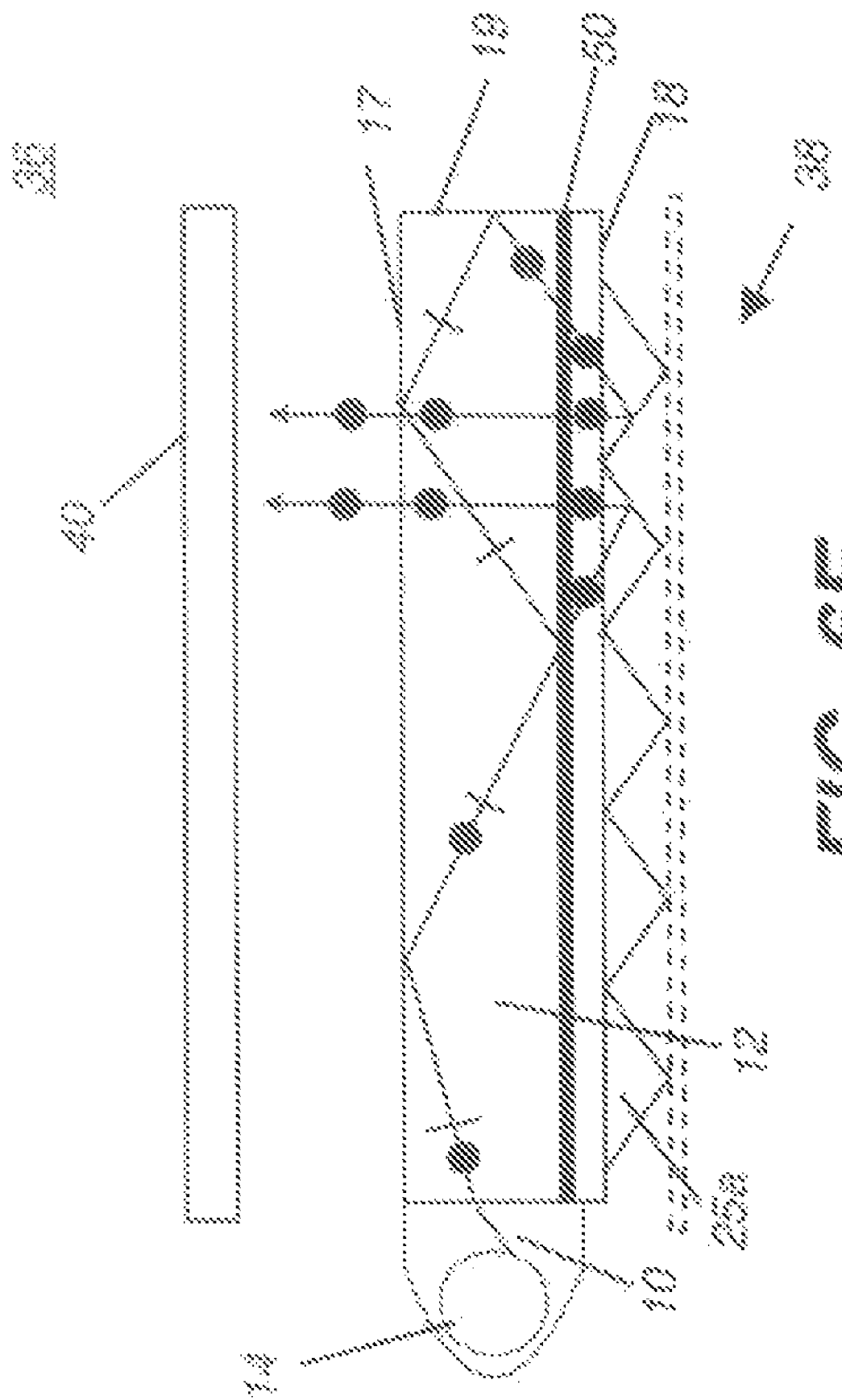

BACKLIGHT CONTAINING FORMED BIREFRINGENCE REFLECTIVE POLARIZER

FIELD OF THE INVENTION

The present invention generally relates to display illumination and more particularly relates to a backlight unit employing a reflective polarizer based on formed birefringence for use with light having a large incident angle.

BACKGROUND OF THE INVENTION

Liquid Crystal Displays (LCDs) are widely used in a broad range of display devices and compete favorably with the more conventional cathode-ray tube (CRT) monitor for numerous display applications. While direct-view LCDs continually improve in resolution, speed, and overall performance, however, display brightness can still be disappointing when compared against CRTs. This shortcoming is particularly noticeable over larger viewing angles.

An inherent problem with LCD displays that limits brightness relates to polarization dependence. In typical applications, the LCD device itself has a pair of absorptive polarizers that absorb half of the unpolarized light emitted from the light source. Thus, even where brighter light sources can be provided, a considerable portion of this light is still discarded.

One solution to this problem has been to use a reflective polarizer, such as Vikuiti™ Dual Brightness Enhancement Film, manufactured by 3M, St. Paul, Minn. or wire grid polarizer wire-grid polarizer available from Moxtek, Inc., Orem, Utah. These devices transmit only the light having the desired polarization for the LCD and reflect light of the orthogonal polarization, which can be re-oriented by illumination components so that it is eventually used.

Reflective polarizers work well for a portion of the light, particularly for light at incident angles near normal with respect to the reflective polarizer. However, light incident at angles diverging from normal, or large-angle light, is not used efficiently. This inefficiency can be difficult to remedy, since some deliberate scattering of light is typically performed within the light guide plate (LGP). Scattering elements, such as printed dots or an etched pattern, are often necessary for uniformizing the light in a conventional backlight system. Thus, uniformization and polarization elements may tend to work at cross-purposes, requiring some compromise to achieve both suitable brightness and acceptable uniformity.

One approach using a reflective polarizer, or polarizing beamsplitter, positions this polarizing component at the bottom face of a light guide plate without any scattering element, as disclosed in U.S. Pat. No. 6,285,423 to Li et al. (see '423 Li et al. FIG. 1a, numeral 20). With this type of arrangement, light transmitted through the reflective polarizer is redirected as illumination output at near normal angles. Light reflected by the reflective polarizer is directed to a polarization converter for changing the polarization of at least a portion of this light and redirecting it for eventual output.

An alternate approach using a reflective polarizer positions this element at the top of a light guide plate without any scattering element, as disclosed in U.S. Pat. No. 6,443,585 to Saccomanno (see '585 Saccomanno FIG. 1 numeral 8). This approach generally provides higher light extraction efficiency due to reduced loss in scattering, but it does not provide a satisfactory polarizing effect.

In order to understand the problems with reflective polarizer use encountered with both the Li et al. '423 and Saccomanno '585 approaches, it is useful to observe how polarized light is handled within the light guide plate of an illumination system. To do this, compare the schematic view of FIG. 1A in the present disclosure with FIG. 1A of the Li et al. U.S. Pat. No. 6,285,423 disclosure and FIG. 1 of the Saccomanno U.S. Pat. No. 6,443,585 disclosure. A beam of light 10 is emitted from a light source 14 that is positioned at the entrant plane of a light guide plate 12. The incident angle at the entrant plane is $\theta_i$, which is between 0 and 90° in the most general case. Beam of light 10 is then coupled into light guide plate 12 and is incident on a reflective polarizer 20. Polarization states are represented using standard schematic notation: S-polarization is represented by a large dot along the line of light, P-polarization is shown by a line orthogonal to the line of light. Three light extraction structures 25 for defeating TIR at the surface of light guide plate 12 are shown; a number of different films or structures, well known in the backlighting illumination arts, could be utilized for this purpose. A polarization converter, such as a quarter-wave film or plate, is located on bottom face 18 or on end face 19, or on both bottom and end faces 18 and 19.

A detailed description of a conventional reflective polarizer 20 can be found in the Li et al. U.S. Pat. No. 6,285,423 disclosure. Briefly, according to conventional practice, reflective polarizer 20 can have a number of possible forms, including: (1) a stack of 1.38/2.35 dielectric layers deposited on polycarbonate substrates; (2) a stack of metal/dielectric layers on a substrate; (3) a layer of birefringent material such as liquid crystalline material sandwiched between two substrates; or (4) a stretched plastic film with a blend of birefringent material and isotropic material, as shown in FIGS. 8c, 10c, and 12c of U.S. Pat. No. 6,285,423. However, it must be emphasized that the polarizing effect is achieved only when the light is within the limited acceptance angle range of the device. According to configurations shown in the Li et al. '423 disclosure, the acceptance angle (referred to as the incident angle in the Li et al. '423 patent) is either in the range 69° to 79° (see Li et al. '423 patent, FIG. 9); 62° to 82° (see Li et al. '423 patent, FIG. 11); or 70° to 84° (see Li et al. '423 patent, FIG. 13).

When the following condition is met for angle $\theta_{TIR}$, the reflective polarizer transmits one polarization and reflects the other polarization due to total internal reflection (TIR), thus separating two polarization states for all light trapped in the light guide plate:

$$\theta_{TIR} = \sin^{-1}\left(\frac{n_o}{n_{LGP}}\right) \leq 90^0 - \sin^{-1}\left(\frac{1}{n_{LGP}}\right) \quad \text{(equation 1)}$$

and $$n_e = n_{LGP},$$

where $n_{LGP}$ is the index of refraction of the light guide plate substrate, $n_o$ is the extraordinary index of refraction, $n_e$ is the ordinary index of refraction.

For a better understanding of the limitations on light incident angle inherent to the conventional approach used in the Li et al. '423 disclosure, it is particularly instructive to take a closer look at the case when reflective polarizer 20 is a layer of birefringent material with extraordinary index $n_e$ and ordinary index $n_o$. In this particular case, the direction of $n_e$ is parallel to the light source 14 or perpendicular to the plane of incidence shown in FIG. 1A. Using the values used in Li et al. '423 by way of example:

$n_e = n_{LGP} = 1.589$ and
$n_o = 1.5$

The light trapped in the light guide has an acceptance angle $\theta_a$, which is bounded as follows:

$$90^\circ - \sin^{-1}\left(\frac{1}{n_{LGP}}\right) \leq \theta_a < 90^\circ \quad \text{(equation 2)}$$

that is, for a substrate with index $n_{LGP} = 1.589$:

$51^\circ \leq \theta_a < 90^\circ$.

Thus, light between 51 and 90 degrees is within the acceptance angle for the light guide.

However, a good polarization separation is provided only where there is total internal reflection, that is, only for light with incident angle greater than $$\theta_{TIR} = \sin^{-1}\left(\frac{n_o}{n_{LGP}}\right).$$

With a conventional light guide plate, this lower threshold is at 71° for $n_o = 1.5$ and $n_{LGP} = 1.589$. This means that, according to the teaching disclosed in the Li et al. '423 patent, reflective polarizer 20 does not provide satisfactory polarization separation effect for light with incident angles between 51° and 71°. Only for light that is in the 71-90 degree range is acceptable polarization separation provided.

Table 1 and the comparative examples of accompanying FIGS. 1B, 1C, and 1D show the shortcomings of the conventional approach to reflective polarizer structure, such as the approach described in the Li et al. '423 disclosure (see Li et al. '423 col. 8, lines 66-67). These examples show a polycarbonate substrate, having $n_{LGP} = 1.589$. In FIGS. 1B-1D, the transmission value for light of S-polarization (polarized perpendicular to the plane of incidence and designated by the circles in FIG. 1A) at various acceptance angles $\theta_a$ is given by curve T90 (filled squares). The reflectivity for the orthogonal polarization, or P-polarization (polarized parallel to the plane of incidence and designated by the lines in FIG. 1A) is given by curve R0 (open triangles). As shown by dashed box Q in FIG. 1B, good separation of light in the range from 51-90 degrees is desired for polarization of light from the light guide plate. Light separation is considered to be acceptable when both T90 and R0 values exceed about 0.8, indicating that 4:1 or better polarization separation is achieved.

In Table 1, exemplary values are given for indices $n_{LGP}$, $n_e$, and $n_o$. The depth D is the thickness of the birefringent polarization material. Of particular interest for overall performance is the overlap angle range and effective acceptance angle $\theta_a$ range given in the right-most columns.

It is to be noted that the 89 degree value shown in tables and used in description in the present disclosure is used to express an angular value for acceptance angle $\theta_a$ that can approach 90 degrees as a limit, but is less than 90 degrees.

For the example of FIG. 1B with depth D=5 μm, the overlapping angle $\theta$ is between 71° and 89°, which is about half the desired 51-90 degree range. Light between 51° and 71° is not well-polarized. The example of FIG. 1C exhibits at least some improvement by using a birefringent layer that has very low ordinary index $n_o = 1.389$. However, this is a theoretical material that yields a very large birefringence of 0.2, given $n_e = 1.589$. It would be unusual to find a usable material having a birefringence of this value for sheet reflective polarizer use, given $n_e = 1.589$. Even if such a material were available, however, the overlapping angle $\theta_a$ is only between 61° and 89°, which still fails to span the desired range.

The example of FIG. 1D comes just a bit closer to the desired performance by using the theoretical material of the FIG. 1C example and varying the depth D of the birefringent layer D=0.5 μm.

TABLE 1

Summary of Parameters and Performance for Conventional Polarizers (LGP substrate $n_{LGP}$ = 1.589)

| FIG. | $n_e$ | $n_o$ | D (μm) | $\theta_R$ (where R0 > 0.8) | $\theta_T$ (where T90 > 0.8) | $\theta_a$ of overlap (T90 > 0.8 R0 > 0.8) | $\theta_a$ range (Note 2) |
|---|---|---|---|---|---|---|---|
| 1B | 1.589 | 1.5 | 5.0 | 71°, 89° | 0°, 89° | 71°, 89° | 19° |
| 1C | 1.589 | 1.389 | 5.0 | 61°, 89° | 0°, 89° | 61°, 89° (Note 1) | 29° |
| 1D | 1.389 | 1.389 | 0.5 | 61°, 89° | 0°, 89° | 61°, 89° (Note 1) | 29° |

(Note 1) - Best theoretical values given.

(Note 2) - The $\theta_a$ range includes all angles in the given overlap range.

As the comparative examples of FIGS. 1B-1D show, conventional solutions to remedy this limitation can be severely hampered by the physical characteristics of the optical materials themselves. For example, this constraint in functional $\theta_a$ range from 71-90 degrees could be eased somewhat if a birefringent material having sufficiently large birefringence were to be used. A birefringence larger than 0.35, for example, would alleviate this problem.

However, materials with large birefringence and other desired properties are not easily available, may not be usable for reflective polarizer use, or may not even exist. Light guide plate 12 must have an index of refraction $n_{LGP}$ that is substantially equal to the larger of the extraordinary index $n_e$ and ordinary index $n_o$. The smaller of the extraordinary index $n_e$ and ordinary index $n_o$ is usually greater than 1.50, which means that the light guide plate must have relatively large index of refraction $n_{LGP}$, for example, that of polycarbonate, 1.589. However, this is undesirable or unworkable, because the most commonly used light guide plate is made of poly (methyl methacrylate) (PMMA) with index of refraction of around 1.49. Thus, solutions using high levels of birefringence are constrained by properties of the dielectric materials themselves.

Clearly, a good portion of the light incident from light source 14 (FIG. 1A) is not used when the reflective polarizer solution described by Li et al. and shown in FIG. 1 of the '423 disclosure is employed. Again, with this type of conventional solution, while light in the 51-90 degree $\theta_a$ range is available, acceptable polarization separation is provided only for light that is in the 71-90 degree range. For the materials most commonly used for light guide plates, no suitable solution has yet been provided for a reflective polarizer that works over the full $\theta_a$ range of light angles within the light guide plate. Attempts to alleviate this problem using conventional approaches have been thwarted by the limitations of the optical materials themselves. There is, therefore, a need for an illumination solution that provides polarized light over a broader incident angle range than is permissible when using conventional reflective polarizer techniques.

SUMMARY OF THE INVENTION

The invention provides a backlight unit comprising in order:

(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;

in which the first material and the second materials are aligned in a direction generally perpendicular to the incident face of the LGP;

wherein:
  (i) the cross-sectional dimensions of the first and second materials, in a plane parallel to the light incident face of the LGP, are smaller than 100 nm in their width dimensions; and
  (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$.

It is a feature of the present invention that it uses formed birefringence to obtain high levels of polarization separation using conventionally available materials.

It is an advantage of the present invention that it provides a reflective polarizer for an illumination apparatus that can exhibit the needed level of polarization separation for use with a light guiding plate in a number of display applications.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 2A is a schematic perspective view showing a backlight unit having a reflective polarizer based on formed birefringence according to the present invention;

FIG. 6A shows the use of the reflective polarizer in combination with a tapered light guide and a light redirecting film according to one embodiment of the present invention;

FIG. 6B shows the use of the reflective polarizer in combination with a light extraction article according to another embodiment of the present invention;

FIG. 6C shows the use of the reflective polarizer positioned toward the bottom face of the light guide plate according to one comparative example;

FIG. 6D shows another use of the reflective polarizer positioned toward the bottom face of the light guide plate according to another comparative example; and FIG. 6E shows the use of the reflective polarizer positioned toward the bottom face of the light guide plate according to an embodiment of the present invention.

DETAILED DESCRIPTION OF THE INVENTION

Figure 1A:
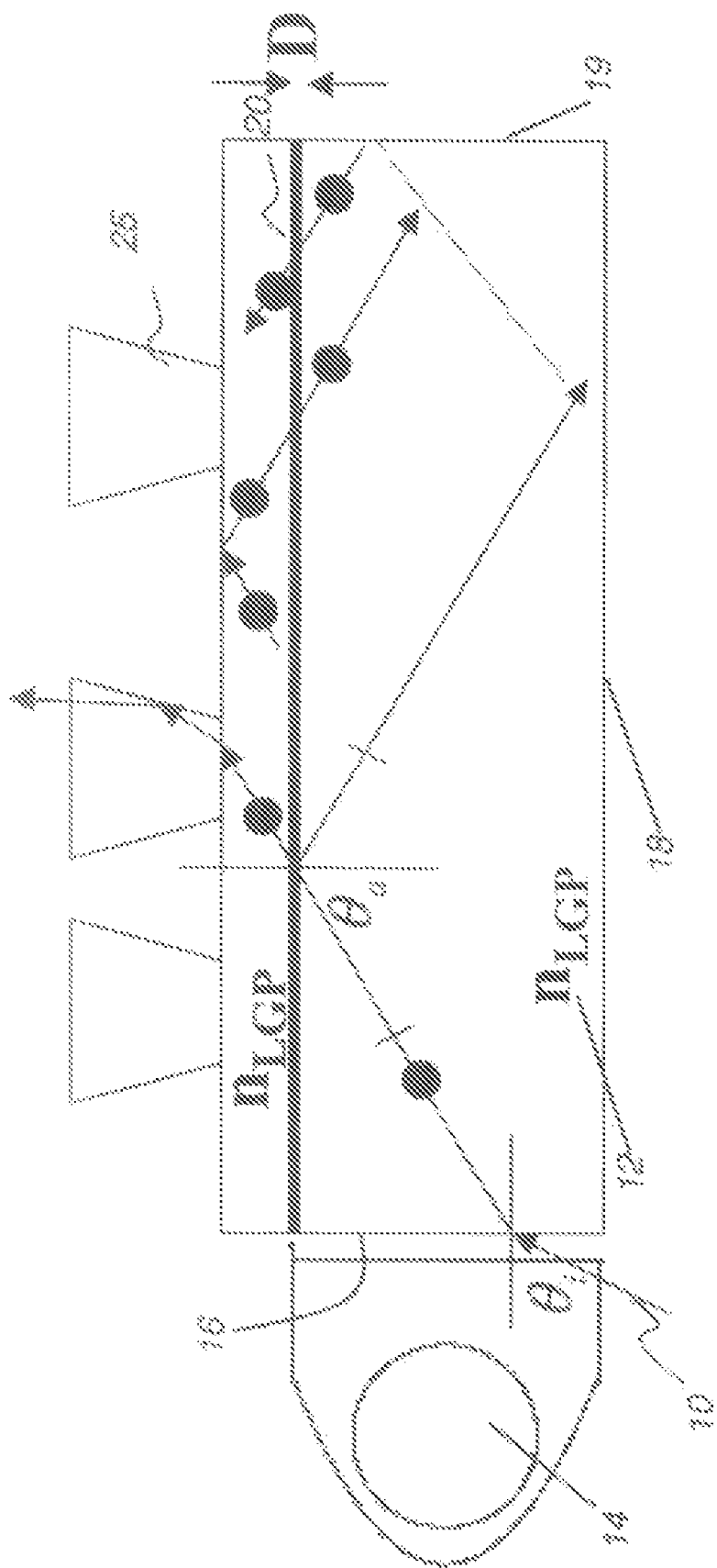
FIG. 1A shows the problem to be solved using a schematic cross-sectional view with a backlight unit having a reflective polarizer.

The present description is directed in particular to elements forming part of, or cooperating more directly with, apparatus in accordance with the invention. It is to be understood that elements not specifically shown or described may take various forms well known to those skilled in the art.

Figures showing the structure and arrangement of the reflective polarizer of the present invention are not drawn with attention to scale, but are provided to show overall structure, composition, and function.

The present invention addresses the problem of angular limitation for polarizing light within the light guide plate by using a novel application of formed birefringence. Formed birefringence, also termed form birefringence, uses devices having generally periodic structures with features and spacing, or pitch dimensions, smaller than a wavelength. The formed birefringence principle is used, for example, in wire grid polarizers that use a grating of conductive wires having sufficiently high spatial frequency that zero order light is no longer diffracted and optical path lengths parallel and perpendicular to the grating features are distinct. One example of a wire-grid polarizer is given in U.S. Pat. No. 6,788,461 entitled "Wire Grid Polarizer" to Kurtz et al. These conventional solutions employ conductive metal wires or elongated metal layers for polarization. While such devices are capable of providing good separation of polarization states, however, their use of metal materials has unwanted side effects due to some inherent amount of light absorption.

In the present invention, however, instead of using reflective and conductive wires, a layer is formed comprising two dielectric, non-conductive materials, extended in length along the general direction of light propagation, one with a high index of refraction $n_1$ and the other with a low index of refraction $n_2$. The two dielectric materials can be isotropic or birefringent. For illustration purposes, all the examples given in this disclosure assume that the two dielectric materials are isotropic, that is, that each material has only one index of refraction. The resulting reflective polarizer of the present invention is structured in such a way that formed birefringence is effected by this arrangement, so that the layer is approximately equivalent in behavior to a layer of highly birefringent material with effective extraordinary index $n_e$ and ordinary index $n_o$. Here, the effective extraordinary index $n_e$ and ordinary index $n_o$ that are obtained as a result of the formed birefringent structure are typically different from the indices $n_1$ and $n_2$ of the original materials. The formed birefringence of this structure is always calculated as a negative number, i.e., $\Delta n = n_e - n_o < 0$. In practice, however, since the difference is the quantity of interest, the absolute value $|\Delta n|$ can be used to quantify birefringence. As a comparison, one or both of $n_1$ and $n_2$ are typically complex numbers for conductive materials, so that the formed birefringence is also a complex number. This arrangement implies some inherent amount of absorption when using conductive materials.

The reflective polarizer according to this invention has three important advantages that are of particular value for display applications. First, the device provides a high level of birefringence $|\Delta n|$ in a range of 0.2-0.5 or greater, well above the birefringence obtained by conventional reflective polarizers that use a single birefringent material. This is made possible with two isotropic materials, one with a low index of refraction $n_2$, as low as 1.0 (air), and, the other, a high index of refraction $n_1$ as large as 1.6-1.8 (with some plastics), and even as large as 2.35 (using inorganic materials such as $TiO_2$.) Second, the effective ordinary index $n_o$ can be adjusted to a low value. Thus, it is possible to use an LGP substrate with low index of refraction that satisfies $n_o = n_{LGP} > n_e$, where $n_{LGP}$ is the refractive index of the LGP substrate, an important relationship for reflective polarizer use with backlighting apparatus, as noted earlier. Third, this reflective polarizer has little absorption due to the fact that both $n_1$ and $n_2$ are real numbers for dielectric, non-conductive materials. As noted earlier, this is in contrast to the conventional conductive wire grid polarizer that exhibits some intrinsic absorption.

The perspective view of FIG. 2A shows a backlight apparatus 38 having light guide plate 12 in optical contact with a reflective polarizer 50 based on formed birefringence according to the present invention. Light guide plate 12 has an incident face 16 facing light source 14. As shown in FIG. 2A, reflective polarizer 50 may be sandwiched between light guide plate 12 and another layer of transparent substrate material, typically a material having the same index of refraction as light guide plate 12.

Reflective polarizer 50 is in optical contact with light guide plate 12. Optical contact, as the term is used in the present disclosure, is equivalent to physical contact or, optionally, to coupling through an optical adhesive. There is no air gap between reflective polarizer 50 and light guide plate 12.

Figure 2B:
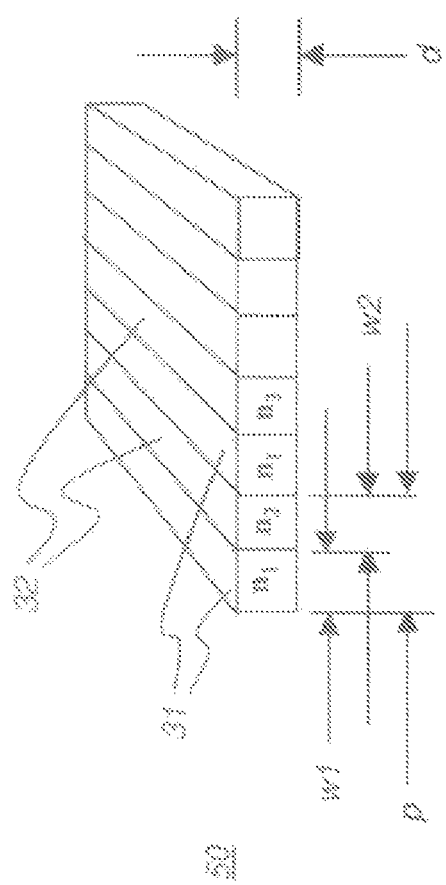
FIG. 2B shows a perspective view of one embodiment of the reflective polarizer used in FIG. 2A.

Reflective polarizer 50 has a number of elongated channels 31 and 32, extended in a length direction that is generally perpendicular to incident face 16 and distributed widthwise in an alternating pattern. The channels are generally perpendicular if at 90° to the incident face or within ±15 degrees. Each channel 31, 32 is formed using a non-conductive or dielectric optical material. As shown in FIG. 2A and in cross section in FIG. 2B, channels 31 and 32 have different indices of refraction $n_1$ and $n_2$. In terms of dimension, channels 31 and 32 are sub-wavelength in width for light of visible wavelengths, generally less than about 150 nm, and extend along the length of reflective polarizer 20, in a direction parallel to the page, or perpendicular incident face 16. Consequently, the reflective polarizer 50 has efficient extraordinary and ordinary refractive indices $n_e$ and $n_o$. The direction of the extraordinary refractive index ne is perpendicular to the length direction of channels 31 and 32. Index $n_o$ then applies for light having a polarization axis that is perpendicular to $n_e$.

In a comparative example, consider channels 31 and 32 extending in a direction orthogonal to the direction shown in FIG. 2A, that is, parallel to incident face 16. This arrangement would result in the direction of the extraordinary refractive index ne being perpendicular to the length direction of light source 14. Thus, light polarized in the plane of the incidence would encounter the combination of $n_e$ and $n_o$, making it difficult to sustain total internal reflection at the reflective polarizer surface.

FIG. 2B shows some important dimensions that determine the polarization behavior of reflective polarizer 50. These include:

$w_1$, $w_2$: cross-sectional widths for channels 31 and 32, respectively;

P: pitch for channels 31 and 32, here equal to $(w_1 + w_2)$;

d: depth for channels 31 and 32.

One important dimensional relationship is the fill factor $f_1$, or duty cycle, which can be stated as follows:

$$f_1 = W_1/P$$

In the context of the present disclosure, pitch P is intended to include average pitch, where there may be some variation in pitch as a result of fabrication.

Figure 2C:
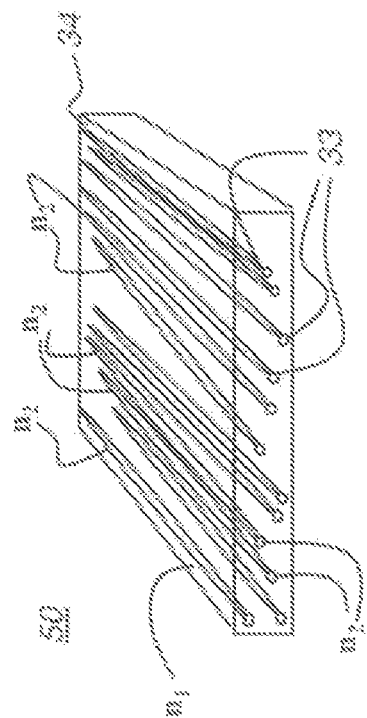
FIG. 2C shows a perspective view of another embodiment of the reflective polarizer used in FIG. 2A.

FIG. 2C shows another embodiment of reflective polarizer 50, having a dispersed material 33 embedded within a matrix material 34, arranged in an alternate pattern that can exhibit the same response as the periodic pattern of FIG. 2B, but with an aperiodic distribution of channels. The dispersed material 33 may have higher or lower index than the matrix material 34. The width dimensions of the embedded material are small compared to the wavelength of the visible light, and are preferably smaller than 150 nm, and more preferably smaller than 100 nm. A pitch P of less than 150 nm is preferred. The shape of the embedded material is preferably elongated. The matrix and dispersed materials can be isotropic or birefringent materials. A large formed birefringence value can also be provided from this configuration. The volume fraction of the embedded (or dispersed) material is related to the fill factor $f_1$ of the reflective polarizer shown in FIG. 2B.

For the formed birefringence embodiments of FIGS. 2A and 2B, graphs in FIGS. 3A-3D show the effective extraordinary index $n_e$ and ordinary index $n_0$, and birefringence $\Delta n = n_e - n_o$ as a function of fill factor $f_1$. Under normal incidence, the effective $n_e$ and $n_o$ indices can be given by the zero-order effective medium theory:

$$n_o 0 = \sqrt{f_1 n_1^2 + (1-f_1) n_2^2}$$

$$n_e 0 = n_1^2 n_2^2 \sqrt{(1-f_1) n_1^2 + f_1 n_2^2},$$

Alternately, the second-order effective medium theory can be used, with the following computations:

$$n_o 2 = \sqrt{(n_o 0)^2 + \frac{1}{3}\left(\frac{P}{\lambda}\right)^2 \pi^2 f_1^2 (1-f_1)^2 (n_1^2 - n_2^2)^2}$$

$$n_e 2 = \sqrt{(n_e 0)^2 + \frac{1}{3}\left(\frac{P}{\lambda}\right)^2 \pi^2 f_1^2 (1-f_1)^2 \left(\frac{1}{n_1^2} - \frac{1}{n_2^2}\right)^2 (n_e 0)^6 (n_o 0)^2}$$

In general, the zero-order value is best applied where the pitch P is very small relative to the wavelengths of incident light, so that:

$$\frac{P}{\lambda} \approx 0$$

Where pitch $$\frac{P}{\lambda}$$

is not negligible, the second order equations are likely to be more accurate.

Figure 3B:
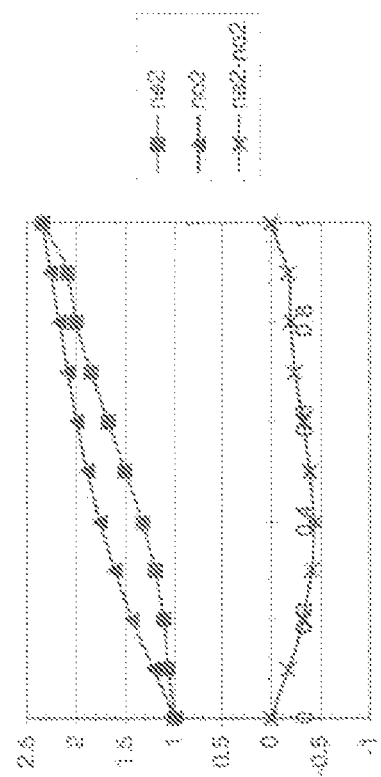
FIGS. 3A-3D show effective extraordinary index $n_e$ and ordinary index $n_o$, and birefringence $\Delta n = n_e - n_o$ as a function of fill factor $f_1$.
Figure 3A:
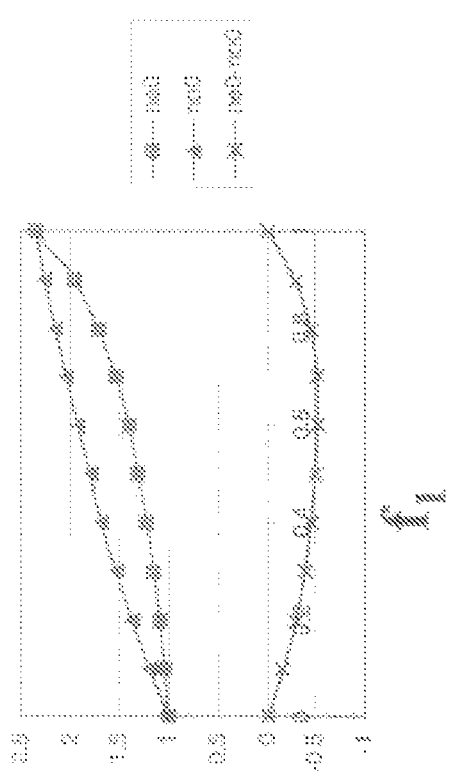

In FIG. 3A (for zero-order) and FIG. 3B (for second-order), the respective indices are $n_1 = 2.35$ $n_2 = 1.0$. In FIG. 3A, for example, a relatively high birefringence value of about −0.5 can be obtained using a fill factor $f_1$ value of approximately 0.6.

Figure 3C:
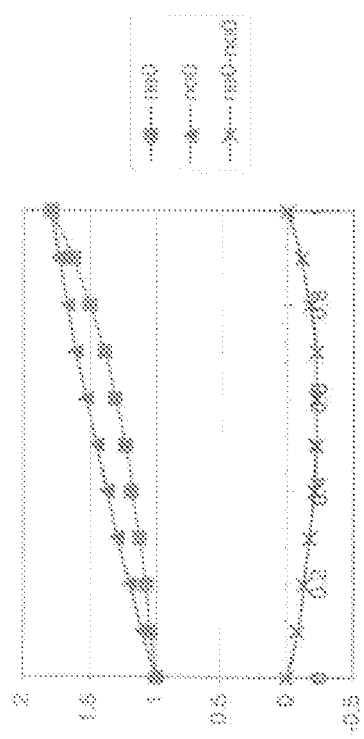
Figure 3D:
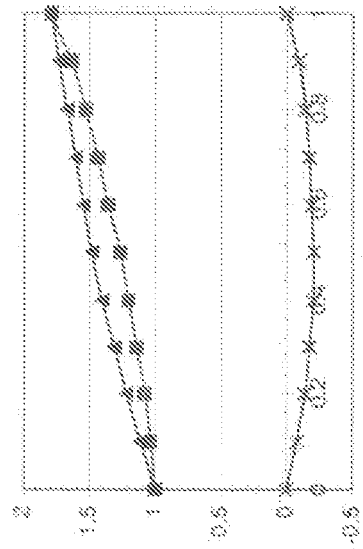

In FIG. 3C (for zero-order) and FIG. 3D (for second-order), the respective indices are $n_1 = 1.8$, $n_2 = 1.0$.

In summary, it can be seen from FIGS. 3A through 3D that a relatively large birefringence value (again, in terms of absolute value) can be obtained using two regular isotropic dielectric materials using the elongated channel arrangement described.

FIGS. 4A-4F and 5A-5J show a few examples of the reflective polarizer based on formed birefringence according to the present invention and using some different possible values for indices $n_{LGP}$, $n_1$, $n_2$, depth d and fill factor $f_1$. For the examples of FIGS. 4A-4F, the LGP 12 substrate is polycarbonate with $n_{LGP}=1.589$. For the examples of FIGS. 5A-5J, the LGP 12 substrate is PMMA with $n_{LGP}=1.49$. In Examples of FIGS. 4A-4F and 5A-5H, the pitch P is 140 nm, and the wavelength of interest is 550 nm. In Examples 5I and 5J, the pitch P is 100 nm, and the wavelength of interest is also 550 nm.

Reference dashed box Q shown in FIGS. 4A-5J shows the range of acceptance angles $\theta_a$ of interest, here 51-90 degrees and facilitates comparison of the reflective polarizer of the present invention with conventional reflective polarizers as shown earlier in FIGS. 1B-1D.

Analyses were modeled at 550 nm using the Gsolver grating analysis software tool, which allows sub-wavelength structures to be thoroughly modeled using rigorous coupled wave analysis (RCWA). Gsolver software is commercially available from Grating Solver Development Company, P.O. Box 353, Allen, Tex.

Examples for Polycarbonate Substrate (FIGS. 4A-4F)

Figure 4B:
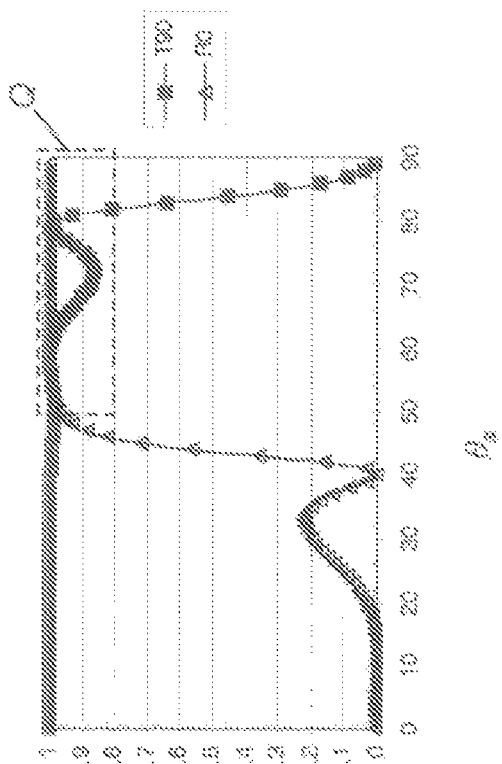
FIGS. 4A-4F show the performance of the reflective polarizers having various dimensional and optical parameters with $n_{LGP}=1.589$.
Figure 4A:
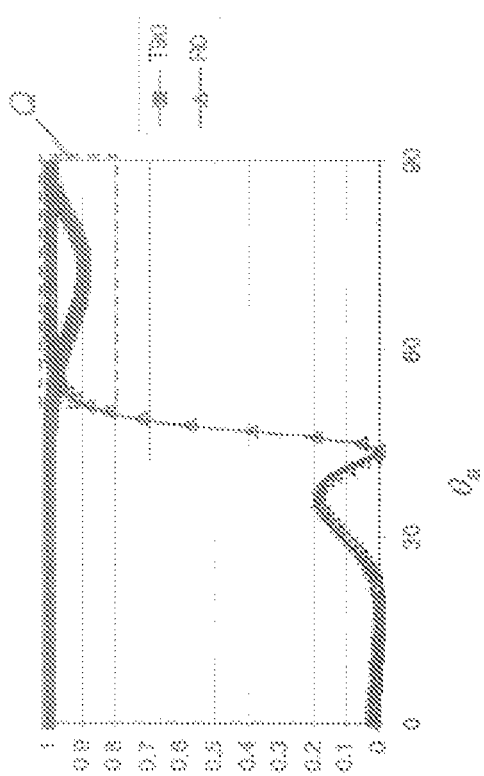

Turning to the example of FIG. 4A, the substrate index of refraction is $n_{LGP}=1.589$, so that that the acceptance angle $\theta_a$ of light trapped in the light guide is in the range given by $51° \leq \theta_a < 90°$, as was described earlier with reference to examples given in the Li et al. '423 patent and summarized in the graphs of FIGS. 1B, 1C, and 1D. The high index of refraction $n_1$ is 2.35, and the low index of refraction $n_2$ is 1.0. The fill factor of the high index material is $f_1 = 0.38$. The thickness of the reflective polarizer is 0.5 mm.

For light polarized in a plane parallel to channels 31 and 32, the light encounters effective ordinary index $n_o$ and LGP 12 substrate index $n_{LGP}$. The transmission vs. acceptance angle behavior is described by curve T90 (filled squares). Because the absorption of the material is small and assumed to approximate zero, the reflection R90=1−T90 and is not plotted. As shown within dashed box Q, the transmission value T90 is greater than 88% for the full range of desired acceptance angles, indicating that light of this polarization is substantially transmitted through the reflective polarizer.

For light polarized in a plane perpendicular to channels 31, 32, effective extraordinary index $n_e$ and substrate index $n_{LGP}$ apply. The reflection vs. acceptance angle characteristic is described by curves R0 (empty triangles). Again, the transmission T0=1−R0 is not plotted. R0 is greater than 90% for all incident angles above 58°, indicating that light of this polarization is reflected from the reflective polarizer. R0 exceeds the threshold of 80% for $51° \leq \theta_a < 90°$, indicating that this reflective polarizer functions well for essentially all the light coupled into the light guide plate.

Figure 1C:
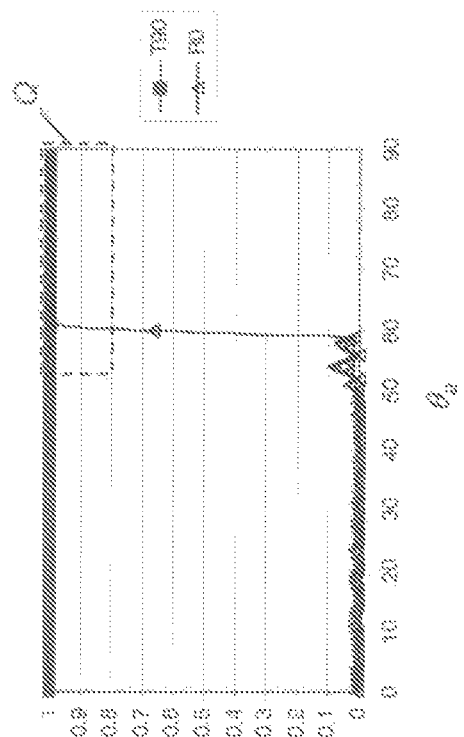
FIGS. 1B, 1C, and 1D are graphs of comparative examples that show theoretical performance that can be achieved using conventional methods and materials for a reflective polarizer.
Figure 1B:
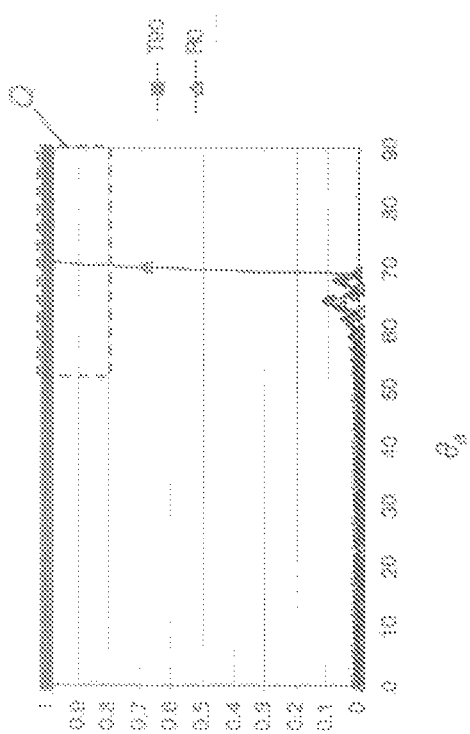
Figure 1D:
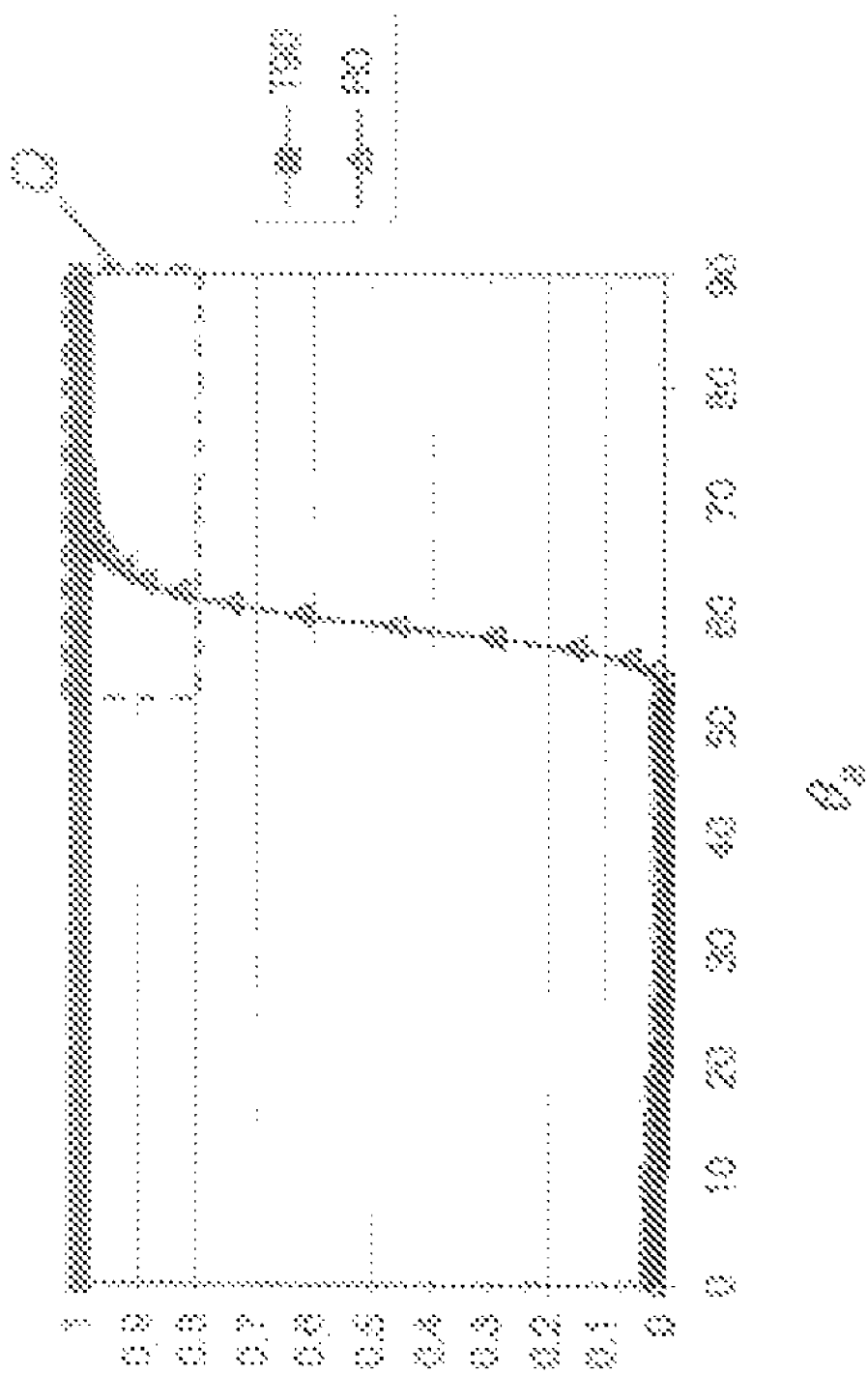

Given the performance shown in FIG. 4A, it can be seen that this reflective polarizer embodiment of the present invention provides a significant improvement over conventional reflective polarizers such as those described with reference to FIGS. 1B-1D, with good effective separation of polarization states over a broader range of light acceptance angles $\theta_a$.

Table 2 that follows gives a summary of parameters and performance values that apply for FIGS. 4A through 4F. For all of the Table 2 examples, indices are $n_{LGP}=1.589$, $n_1=2.35$, $n_2=1.0$, and the pitch P=140 nm. The depth d and fill factor $f_1$ values vary from one example to the next.

Example 1, described with reference to the curves of FIG. 4A, with d=0.5 μm, $f_1=0.38$, provides the best performance for polarization separation, with the overlapping angle $\theta_a$ range (where T90>0.8 and R0>0.8), extending from 50° through 89°.

Example 2, shown in FIG. 4B, uses the same values given in Example 1, but with fill factor $f_1=0.30$. The overlapping angle $\theta_a$ range is between 46° and 82°, wider in the lower bound but not optimal for light at higher angles.

Figure 4D:
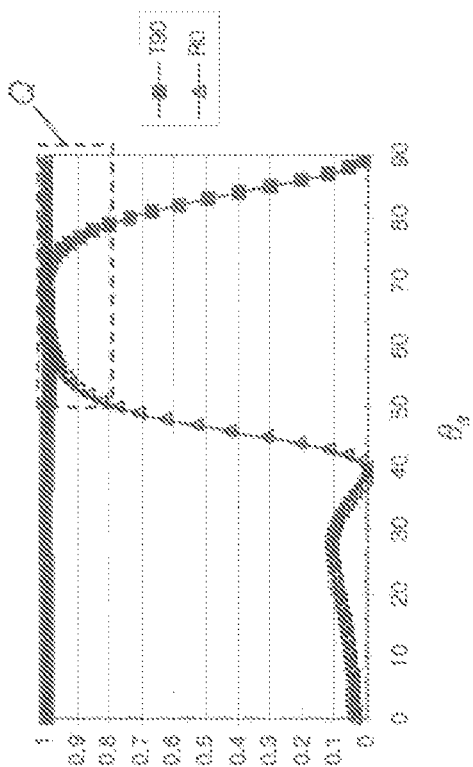
Figure 4C:
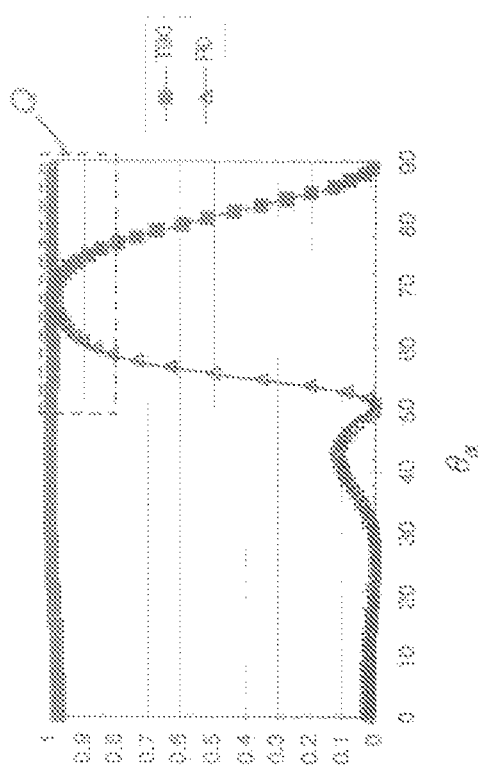

Example 3, shown in FIG. 4C, uses the same values given in Example 1, but with fill factor $f_1=0.50$. The overlapping angle θ is between 59° and 77°, which is narrower with respect to both lower and upper bounds.

Example 4, shown in FIG. 4D, uses the same values given in Example 1, but with depth d=0.40 μm. The overlapping angle θ is between 51° and 79°, which has about the same lower bound and narrower upper bound.

Figure 4E:
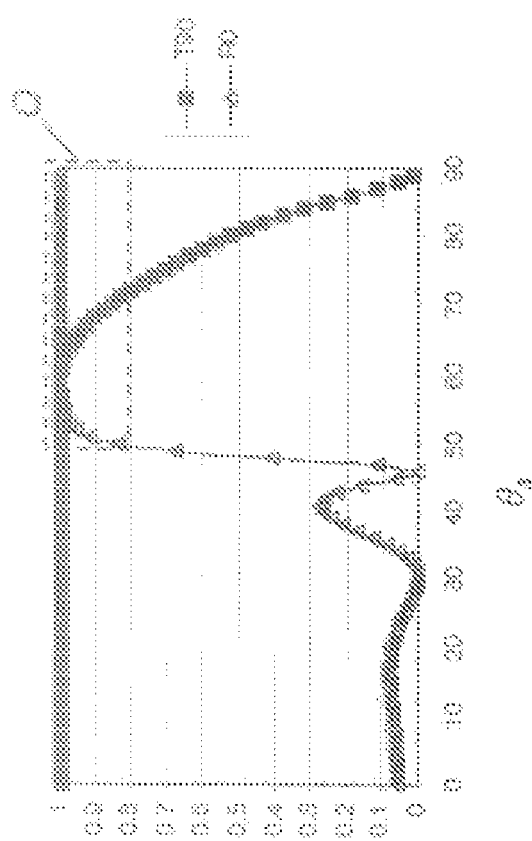

Example 5, shown in FIG. 4E, uses the same values given in Example 1, but with depth d=0.60 μm. The overlapping angle θ is between 50° and 72°, which has about the same lower bound and narrower upper bound.

Figure 4F:
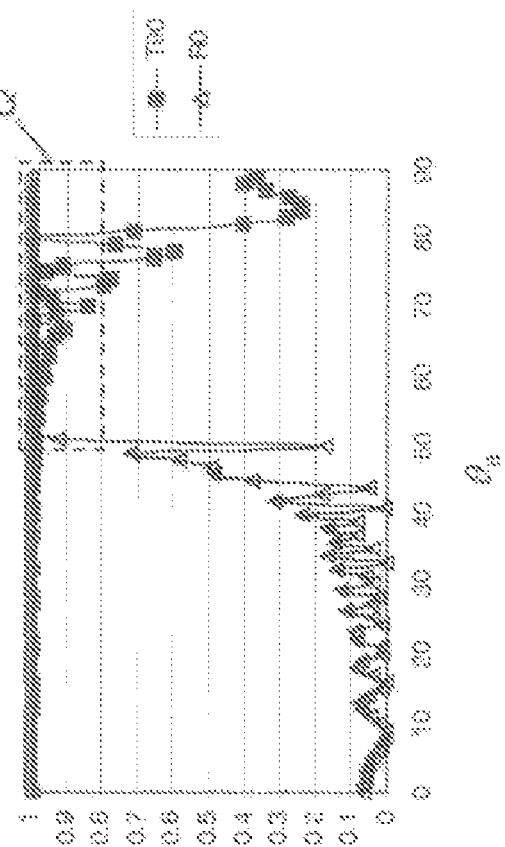

Example 6, shown in FIG. 4F, uses the same values given in Example 1, but with depth d=5.0 μm. The overlapping angle θ is between 51° and 72°, which has about the same lower bound and upper bound as the FIG. 4E example.

TABLE 2

Summary of FIG. 4A-4F Examples (Polycarbonate LGP substrate $n_{LGP}$ = 1.589)

| EX | | $n_1$ | $n_2$ | d (μm) | $f_1$ | $\theta_R$ (R0 > 0.8) | $\theta_T$ (T90 > 0.8) | $\theta_a$ of overlap (T90 > 0.8 R0 > 0.8) | $\theta_a$ range (Note 1) |
|---|---|---|---|---|---|---|---|---|---|
| 1 | FIG. 4A | 2.35 | 1.0 | 0.50 | 0.38 | 50°, 89° | 0°, 89° | 50°, 89° | 40° |
| 2 | FIG. 4B | 2.35 | 1.0 | 0.50 | 0.30 | 46°, 89° | 0°, 82° | 46°, 82° | 37° |
| 3 | FIG. 4C | 2.35 | 1.0 | 0.50 | 0.50 | 59°, 89° | 0°, 77° | 59°, 77° | 19° |
| 4 | FIG. 4D | 2.35 | 1.0 | 0.40 | 0.38 | 51°, 89° | 0°, 79° | 51°, 79° | 29° |
| 5 | FIG. 4E | 2.35 | 1.0 | 0.60 | 0.38 | 50°, 89° | 0°, 72° | 50°, 72° | 23° |
| 6 | FIG. 4F | 2.35 | 1.0 | 5.0 | 0.38 | 51°, 89° | 0°, 72° | 51°, 72° | 22° |

(Note 1) - The $\theta_a$ range includes all angles in the given overlap range.

Examples for PMMA Substrate (FIGS. 5A-5J)

The examples of FIGS. 5A through 5J, summarized in Table 3, show performance of a reflective polarizer according to the present invention with slightly different parameters than were given for the examples of FIGS. 4A through 4F, notably, a different substrate index of refraction $n_{LGP}$. For these examples, the LGP index of refraction $n_{LGP}$=1.49, so that that the acceptance angle $\theta_a$ of light trapped within the light guide is in the range given by about 48°≦$\theta_a$<90°. As discussed earlier, the most commonly used light guide plate material is PMMA with an index of refraction of around 1.49. Reference dashed box Q shown in FIGS. 5A-5J shows the range of acceptance angles $\theta_a$ of interest, from about 48-90 degrees, with values for T90 and R0 above 0.8, and facilitates comparison of the reflective polarizer of the present invention with conventional reflective polarizers, as shown earlier in FIGS. 1B-1D, and with the inventive examples of FIGS. 4A through 4F.

Figure 5A:
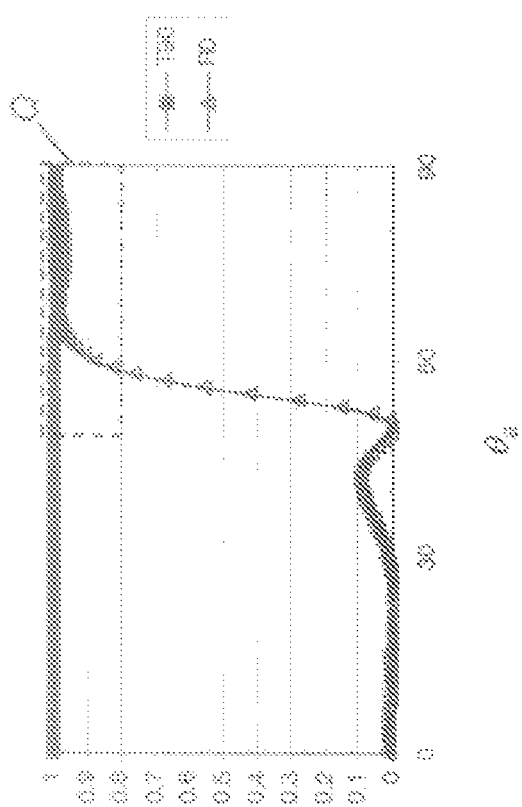
FIGS. 5A-5J show the performance of the examples having various dimensional and optical parameters with $n_{LGP}=1.49$.

Referring first to FIG. 5A, the high index of refraction $n_1$ is 1.80, and the low index of refraction $n_2$ is 1.0. The pitch P=140 nm. The fill factor of the high index material is $f_1$=0.524. The thickness of the reflective polarizer is 0.5 mm. Here, reflection R0 exceeds 80% for acceptance angles $\theta_a$ above about 59°, indicating that light of this polarization is reflected from the reflective polarizer. This reflective polarizer design is thus significantly improved over conventional reflective polarizers, but not quite as good as some of the earlier examples given.

Figure 5B:
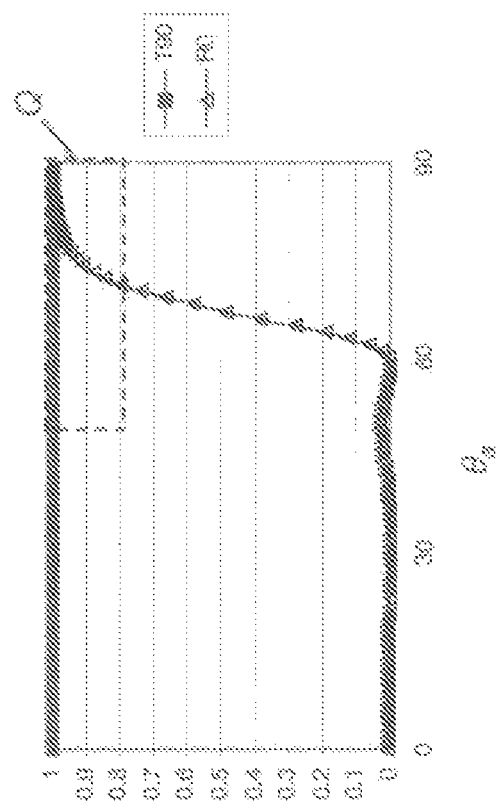

In the example of FIG. 5B, the high index of refraction $n_1$ is 1.589, which corresponds to that used in the Li et al. '423 disclosure (referring to FIGS. 12 and 13 in the '423 disclosure). The low index of refraction $n_2$ is 1.0. The fill factor of the high index material is $f_1$=0.787. For light polarized in a plane parallel to channels 31, 32, light sees ordinary index $n_o$ and LGP 12 substrate index $n_{LGP}$. Transmission T90 is greater than 95% for all acceptance angles $\theta_a$. Reflection R0 is greater than 80% for acceptance angles above 71°. R0 is greater than 50% for 67.5°≦$\theta_a$<90°. It can be observed that this reflective polarizer has comparable polarization separation efficiency to that of conventional reflective polarizers, with the advantage of using a substrate with lower index of refraction (1.49 vs. 1.589). Thus, even though the overall range for acceptance angle $\theta_a$ is disappointing, performance is at least as good as that described in the Li et al. '423 disclosure, but using standard LGP 12 material (PMMA) rather than the less commonly used polycarbonate material that the Li et al. solution resorts to.

Figure 5C:

The example of FIG. 5C is similar to that of FIG. 5B, except that the thickness of the layer d=5 μm and the fill factor of the high index material is $f_1$=0.785. The overall separation performance is similar to that described in the Li et al. '423 disclosure.

Figure 5D:
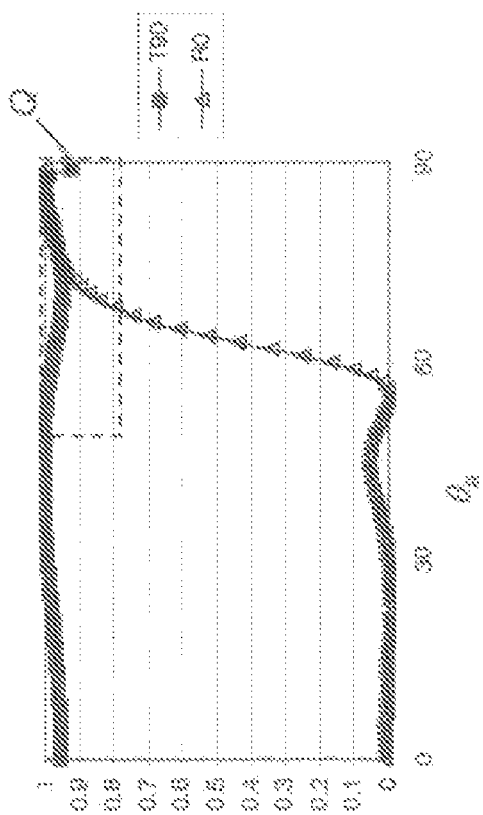
Figure 5E:
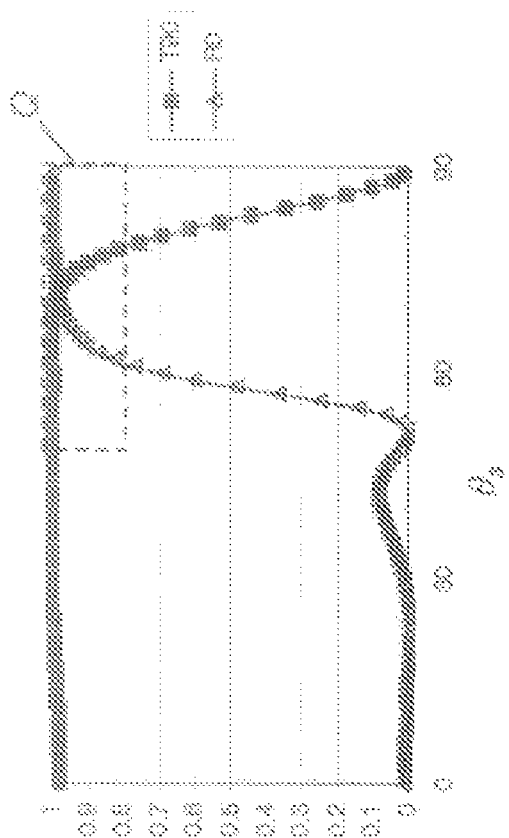
Figure 5F:
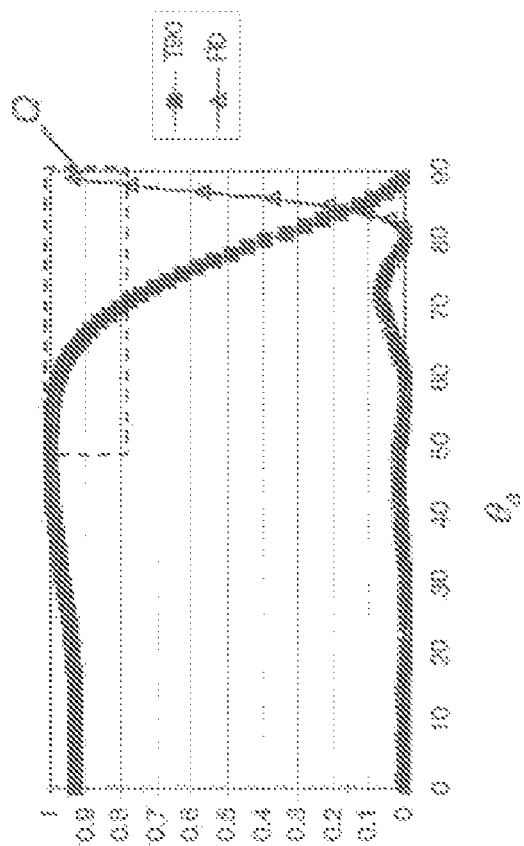
Figure 5G:
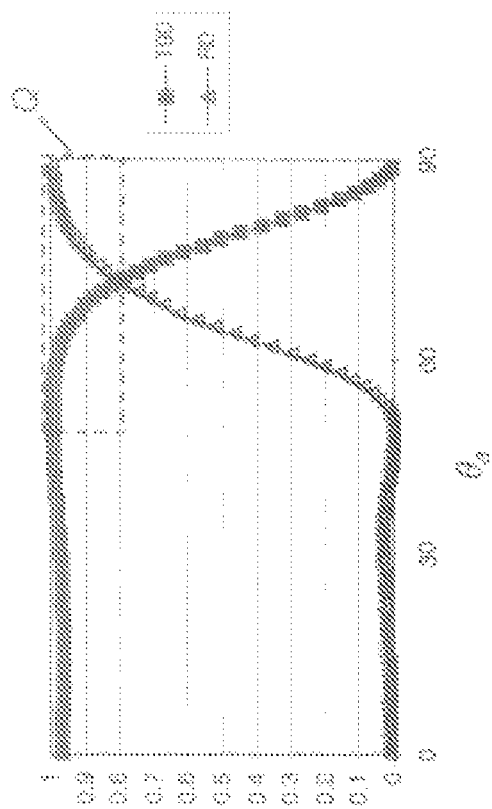
Figure 5H:
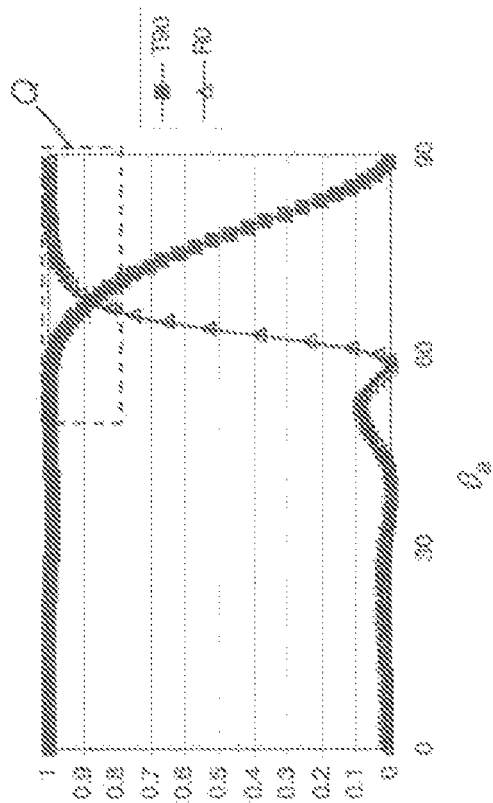
Figure 5I:
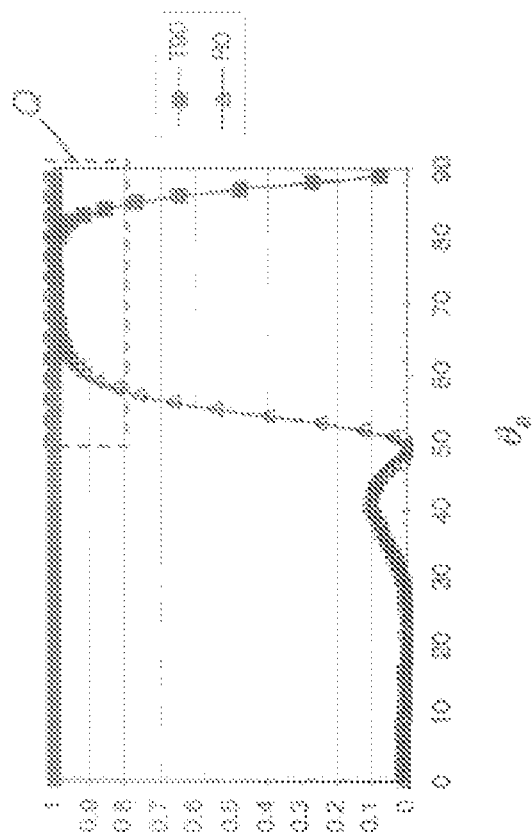
Figure 5J:
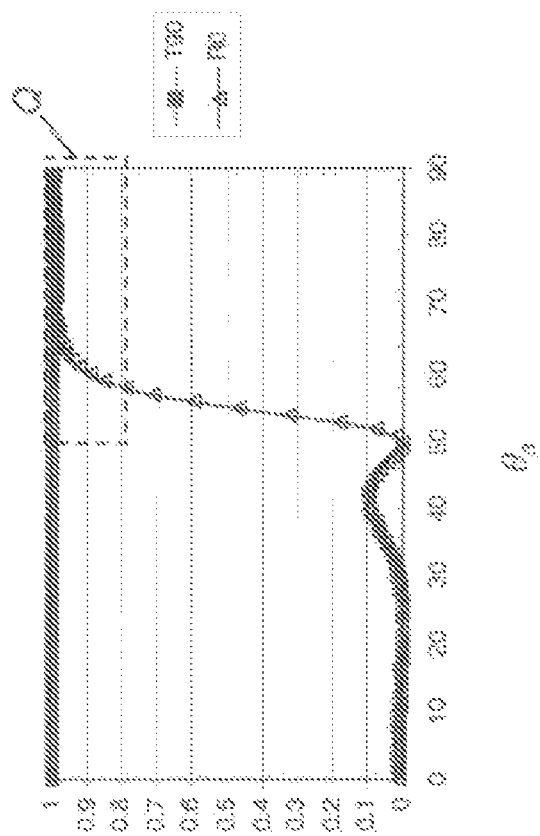

The example of FIG. 5D is similar to that of FIG. 5B, but with the high index of refraction $n_1$ at 2.35. The example of FIG. 5E is similar to that of FIG. 5D but with fill factor $f_1$=0.45. The example of FIG. 5F is similar to that of FIG. 5D but with $f_1$=0.6. Here, there is no overlapping area where polarization separation is acceptable. Similarly, FIG. 5G shows an example with depth d–0.4 μm and no overlapping. FIG. 5H shows an example similar to that of FIG. 5G, but with depth d=0.6 μm and very narrow overlapping. FIG. 5I shows a similar example with pitch P=100 nm instead of 140 nm. FIG. 5J shows a similar example with fill factor $f_1$=0.534. It can be noted that a slight change in the fill factor $f_1$ minimizes the interference effect due to the change in layer thickness.

TABLE 3

Summary of FIG. 5A-5H Examples (PMMA LGP substrate $n_{LGP} = 1.49$)

| EX | | $n_e$ | $n_o$ | d (μm) | $f_1$ | $θ_R$ (R0 > 0.8) | $θ_T$ (T90 > 0.8) | $θ_a$ of overlap (T90 > 0.8 R0 > 0.8) | $θ_a$ range (Note 1) |
|---|---|---|---|---|---|---|---|---|---|
| 7 | FIG. 5A | 1.8 | 1.0 | 0.5 | 0.524 | 59°, 89° | 0°, 89° | 59°, 89° | 31° |
| 8 | FIG. 5B | 1.589 | 1.0 | 0.5 | 0.787 | 71°, 89° | 0°, 89° | 71°, 89° | 29° |
| 9 | FIG. 5C | 1.589 | 1.0 | 5.0 | 0.785 | 69°, 89° | 0°, 89° | 69°, 89° | 21° |
| 10 | FIG. 5D | 2.35 | 1.0 | 0.5 | 0.5 | 69°, 89° | 0°, 89° | 69°, 89° | 21° |
| 11 | FIG. 5E | 2.35 | 1.0 | 0.5 | 0.45 | 62°, 89° | 0°, 78° | 62°, 78° | 17° |
| 12 | FIG. 5F | 2.35 | 1.0 | 0.5 | 0.6 | 89°, 89° | 0°, 70° | None | — |
| 13 | FIG. 5G | 2.35 | 1.0 | 0.4 | 0.5 | 72°, 89° | 0°, 71° | None | — |
| 14 | FIG. 5H | 2.35 | 1.0 | 0.6 | 0.5 | 67°, 89° | 0°, 70° | 67°, 70° | 4° |
| 15 | FIG. 5I | 1.8 | 1.0 | 0.6 | 0.524 | 68°, 89° | 0°, 84° | 58°, 84° | 27° |
| 16 | FIG. 5J | 1.8 | 1.0 | 0.6 | 0.534 | 59°, 89° | 0°, 89° | 59°, 89° | 31° |

(Note 1) - The $θ_a$ range includes all angles in the given overlap range.

The examples given in FIGS. 4A-4F and 5A-5J are not limiting but are for illustration purposes. Many other parameter variations would be allowed. For example, the shape of channels 31, 32 can be varied from the rectangular cross-section shown in FIGS. 2A and 2B; other shapes known in the art can be used as well. The pitch P can be longer or shorter, as long as only zero order diffraction occurs. The low index material does not need to be air, but could also be any of various materials having a relatively low index of refraction, such as MgF$_2$, for example. Both the high and low index materials can also be birefringent, as long as their optic axes are aligned in parallel.

Fabrication

Any of a number of different fabrication techniques could be used for forming reflective polarizer 50. For an embodiment using air in channels 32, the channel structure can be directly patterned into the substrate that will form channels 31 using standard photolithography. Other methods could use deposition of material 31 onto the substrate using inkjet printing or other precision deposition techniques.

In an alternate method using photolithography, a metal layer could be applied as a mask for subsequent etching. Here, a metal layer is deposited, using a metal such as aluminum. The deposition method can be one of several standard methods including thermal evaporation or sputtering. Next the metal is patterned using standard photolithography followed by a metal etch (possibly dry metal etch such as CC14, BC13) to form a mask pattern. Channels 32 can then be etched to remove unwanted material, leaving the desired void for air.

Alternatively, methods including repeatedly etching the dielectric or ion beam milling could be employed. Lift off methods can also be used. Wet etch using etch compounds such as HF for a SiO2 etch could be used.

In other embodiments, multiple layers of dielectric materials could be deposited to form either or both channels 31 and 32. This type of fabrication would require repeated processes of deposition and etching until the proper depth d (FIG. 2B) is attained.

Referring back to the embodiment shown in FIG. 2C, in another method for fabrication of the reflective polarizer, voided air is mixed with an inorganic or organic binder having a suitable index of refraction. The medium is then stretched along one direction. The dimension of the voided air is smaller than wavelength of light in this direction, and is larger than a few wavelengths of light in the orthogonal direction. The relative ratio of voids to binder is equivalent to the fill factor $f_1$ of the channel, which determines the effective extraordinary and ordinary indices $n_e$ and $n_o$.

Reflective polarizer 50 of the present invention can be used for display backplane illumination in a number of different possible embodiments. Referring to FIG. 6A, reflective polarizer 50 is used in optical contact with a tapered light guide plate 30, and a light redirecting film 26 in a display 36. This combination of backplane illumination components directs polarized light through LCD modulator 40, enhances light utilizing efficiency, and reduces the requirement for polarization components that are normally provided as part of LCD modulator 40. Note that there is polarization converter such as a quarter-wave film or plate located on the bottom face 18 and/or the end face 19.

FIG. 6B shows reflective polarizer 50 used in optical contact with a flat or non-tapered light guide plate 12. Light extraction structures 25, either on a separate film, as indicated in dashed lines, or directly formed in or applied to the substrate surface, provide a light extraction article. As with the FIG. 6A embodiment, this combination also helps to enhance light utilization efficiency and to reduce or eliminate requirements for polarization components elsewhere in the display system.

Reflective polarizer 50 can be combined with light guide plate 12 in a number of different possible configurations. FIGS. 6A and 6B show examples in which reflective polarizer 50 is positioned toward the top surface of light guide plate 12.

FIGS. 6C, 6D, and 6E show embodiments that position reflective polarizer 50 toward the base of light guide plate 12. The location of reflective polarizer 50 of the present invention and the light redirection components appear to be important in order to obtain suitable performance levels with these embodiments.

Turning first to the illustrative example of FIG. 6C, the condition $n_{LGP}=n_o>n_e$ is met. Consequently, the light that is polarized in the plane parallel to the channels is transmitted through reflective polarizer 50 and light that is polarized perpendicular to the channels is reflected by reflective polarizer 50. However, light of either polarization can be directed through light extraction structures 25, which contradicts the function of the reflective polarizer 50. Thus, this configuration does not perform to requirements for most reflective polarizer applications.

Similarly, in FIG. 6D, the condition $n_o>n_e=n_{LGP}$ is met. As a result, the light that is polarized in the plane parallel to the channels is reflected by the reflective polarizer 50 and light that is polarized perpendicular to the channels is transmitted through the reflective polarizer 50. Light of either polarization also exits from the light extraction structures 25, similar to what is shown in FIG. 6C. Therefore, this configuration is not suitable either.

FIG. 6E shows how light extraction features must be arranged in order to use reflective polarizer 50 effectively if positioned toward the base of light guide plate 12. In FIG. 6E, the condition $n_o > n_e = n_{LGP}$ is met, as in FIG. 6D. Here, however, a light extraction structure 25a is placed on the bottom face 18 of the light guide plate 12. By relocating the light extraction features from the top face to bottom face as light extraction structure 25a, light that is polarized in the plane parallel to the channels is trapped within light guide plate 12 until its polarization is converted to a usable state. Here, only light that has a polarization axis perpendicular to the channels is emitted from the light guide plate.

By comparison against conventional reflective polarizer solutions such as those described in the background section given earlier, the reflective polarizer of the present invention provides improved polarization separation over the broad range of angles of light within the light guide plate. By using formed birefringence, the reflective polarizer of the present invention provides a high degree of polarization separation in a compact, low-cost component.

The entire contents of the patents and other publications referred to in this specification are incorporated herein by reference. The invention has been described in detail with particular reference to certain preferred embodiments thereof, but it will be understood that variations and modifications can be effected within the spirit and scope of the invention.

| PARTS LIST |
| --- |
| 10. Beam of light |
| 12. Light guide plate |
| 14. Light source |
| 16. Incident face |
| 17. Top face |
| 18. Bottom face |
| 19. End face |
| 20. Reflective polarizer |
| 25, 25a. Light extraction structure |
| 26. Light redirecting film |
| 30. Tapered light guide plate |
| 31, 32. Channel |
| 33. Dispersed material |
| 34. Matrix material |
| 36. Display |
| 38. Backlight apparatus |
| 40. LCD modulator |
| 50. Reflective polarizer |

The invention claimed is:

1. A backlight unit comprising in order:
   (1) a light source;
   (2) a light guide plate (LGP) having an incident face toward the light source and having a refractive index $n_{LGP}$;
   (3) a reflective polarizer having formed birefringence in optical contact with the LGP including a layer having:
      (a) an elongated non-conductive first material with refractive index $n_1$;
      (b) an elongated non-conductive second material with a refractive index $n_2$ different by at least 0.2 from that of to first material;
   in which the first material and the second materials are aligned in a direction generally perpendicular to the incident face of the LGP; wherein:
      (i) the cross-sectional dimensions of the first and second materials, in a plane parallel to the light incident face of the LGP, are smaller tan 100 nm in their width dimensions; and
      (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein the parameters selected include pitch, thickness, cross-sectional width, $n_1$, $n_2$, $n_{LGP}$, location of reflective polarizer, and fill factor.

2. The backlight unit of claim 1 wherein the reflective polarizer has a thickness d that is less than 5 microns.

3. The backlight unit of claim 1 wherein the reflective polarizer has a thickness d that is less than 1 micron.

4. The backlight unit of claim 1 wherein the light guide plate is tapered.

5. The backlight unit of claim 4 further comprising a light redirecting film.

6. The backlight unit of claim 1 wherein the light guide plate is non-tapered.

7. The backlight unit of claim 1 wherein the reflective polarizer is sandwiched between the light guide plate and a layer of transparent substrate.

8. The backlight unit of claim 1 wherein the reflective polarizer is disposed closer to the top of the light guide plate than to the bottom of the light guide plate.

9. The backlight unit of claim 5 further comprising a light extraction article on the top face of the light guide plate.

10. The backlight unit of claim 1 wherein the reflective polarizer is disposed closer to the bottom of the light guide plate than to the top of the light guide plate.

11. The backlight unit of claim 10 further comprising a light extraction article on the bottom face of the light guide plate.

12. The backlight unit of claim 1 wherein the light guide plate is fabricated from a material taken from the group consisting of PMMA and polycarbonate.

13. The backlight unit of claim 1 wherein the first material is air.

14. The backlight unit of claim 1 wherein the first material or the second material is birefringent.

15. A backlight unit comprising in order:
   (1) a light source;
   (2) a light guide plate (LGP) having an incident face toward the light source and having a refractive index $n_{LGP}$;
   (3) a reflective polarizer having formed birefringence in optical contact with the LGP including a layer having:
      (a) an elongated non-conductive first material with refractive index $n_1$;
      (b) an elongated non-conductive second material with a refractive index $n_2$ different by at least 0.2 from that of the first material;
   in which the first material and the second materials are aligned in a direction generally perpendicular to the incident face of the LGP; wherein:
      (i) the cross-sectional dimensions of the first and second materials, in a plane parallel to the light incident face of the LGP, are smaller than 100 nm in their width dimensions; and
      (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein the parameters selected in part (ii) satisfy the requirements over at least 20° for $\theta_a$.

16. A backlight unit comprising in order:
(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;
in which the first material and the second materials are aligned in a direction generally perpendicular to the incident face of the LGP; wherein:
  (i) the cross-sectional dimensions of the first and second materials, in a plane parallel to the light incident face of the LGP, are smaller than 100 nm in their width dimensions; and
  (ii) the parameters of the reflective polarizer are selected to provide R0>0.8 for one polarization state and T90>0.8 for the orthogonal polarization state, for light of wavelength of 550 nm, for least one reflective polarizer angle of light incidence at an angle between $$90^0 - \sin^{-1}\left(\frac{1}{n_{LGP}}\right)$$

and 89 degrees.

17. A backlight unit comprising in order:
(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;
in which the first material and the second materials are aligned in a direction generally perpendicular to the incident face of the LGP; wherein:
  (i) the cross-sectional dimensions of the first and second materials, in a plane parallel to the light incident face of the LGP, are smaller than 100 nm in their width dimensions; and
  (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein T0 for light having the first polarization axis substantially parallel to the incident face of the light guide plate exceeds 0.88.

18. A backlight unit comprising in order:
(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;
in which the first material and the second materials are aligned in a direction generally perpendicular to the incident face of the LGP; wherein:
  (i) the cross-sectional dimensions of the first and second materials, in a plane parallel to the light incident face of the LGP, are smaller than 100 nm in their width dimensions; and
  (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein R90 for light having a second polarization axis substantially perpendicular to the first polarization axis exceeds 0.88.

19. A backlight unit comprising in order:
(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;
in which the first material and the second materials are aligned in a direction generally perpendicular to the incident face of the LGP; wherein:
  (i) the cross-sectional dimensions of the first and second materials, in a plane parallel to the light incident face of the LGP, are smaller than 100 nm in their width dimensions; and
  (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein the ratio of the cross-sectional dimension of the first material to the pitch P, wherein the pitch P equals the sum of the cross-sectional dimension of the first material plus the cross-sectional dimension of the second material of the reflective polarizer, is in the range between 0.2 and 0.8 micron.

20. A backlight unit comprising in order:
(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;
in which the first material and the second materials are aligned in a direction generally perpendicular to the incident face of the LGP; wherein:
  (i) the cross-sectional dimensions of the first and second materials, in a plane parallel to the light incident face of the LGP, are smaller than 100 nm in their width dimensions; and
  (ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein the reflective polarizer provides both the transmission and the reflection exceeding 80% for all light incident to the reflective polarizer surface at an angle between $$90^0 - \sin^{-1}\left(\frac{1}{n_{LGP}}\right)$$

and 89 degrees.

21. A backlight unit comprising in order:
(1) a light source;
(2) a light guide plate (LGP) having an incident face toward the light source and having a refractive index $n_{LGP}$;
(3) a reflective polarizer having formed birefringence in optical contact with the LGP including a layer having:
  (a) an elongated non-conductive first material with refractive index $n_1$;
  (b) an elongated non-conductive second material with a refractive index $n_2$ different by at least 0.2 from that of the first material;
in which the first material and the second materials are aligned in a direction generally perpendicular to the incident face of the LGP; wherein:
(i) the cross-sectional dimensions of the first and second materials, in a plane parallel to the light incident face of the LGP, are smaller than 100 nm in their width dimensions; and
(ii) the parameters of the reflective polarizer are selected to provide R0>0.8 for one polarization state and T90>0.8 for the orthogonal polarization state, for light of wavelength of 550 nm, for least one reflective polarizer angle of light incidence $\theta_a$, wherein the first and second materials are aligned in alternating channels running in a direction generally perpendicular to the incident face of the light guide plate and having a pitch less than 150 nm, the reflective polarizer layer providing both transmission of a first polarization state and reflection of the second orthogonal polarization state for some light incident to the reflective polarizer surface at an angle between $$90^0 - \sin^{-1}\left(\frac{1}{n_{LGP}}\right)$$

and 89 degrees, both the transmission of the first polarization state and the reflection of the second polarization state exceeding 80% for light at the wavelength of 550 nm, and the first polarization axis being substantially parallel to the incident face of the light guide plate.

* * * * *